US005740673A

United States Patent [19]
Smith et al.

[11] Patent Number: 5,740,673
[45] Date of Patent: Apr. 21, 1998

[54] OPERATION OF INTEGRATED GASIFICATION COMBINED CYCLE POWER GENERATION SYSTEMS AT PART LOAD

[75] Inventors: Arthur Ramsden Smith, Telford; Donald Winston Woodward, New Tripoli, both of Pa.

[73] Assignee: Air Products and Chemicals, Inc., Allentown, Pa.

[21] Appl. No.: 553,187

[22] Filed: Nov. 7, 1995

[51] Int. Cl.$^6$ ....................................... F02C 3/28
[52] U.S. Cl. ............................. 60/39.02; 60/39.12
[58] Field of Search .................. 60/39.02, 39.12, 60/726, 39.03

[56] References Cited

U.S. PATENT DOCUMENTS

| | | | |
|---|---|---|---|
| 3,731,495 | 5/1973 | Coveney | 62/39 |
| 4,019,314 | 4/1977 | Springmann | 60/39.02 |
| 4,224,045 | 9/1980 | Olszewski et al. | 62/30 |
| 4,557,735 | 12/1985 | Pike | 55/26 |
| 4,697,415 | 10/1987 | Schiffers | 60/39 |
| 5,081,845 | 1/1992 | Allam et al. | 62/24 |
| 5,386,686 | 2/1995 | Chretien et al. | 60/39 |
| 5,406,786 | 4/1995 | Sscharpf et al. | 60/39.05 |
| 5,410,869 | 5/1995 | Muller | 60/39.02 |

FOREIGN PATENT DOCUMENTS 2067668 7/1981 United Kingdom.

OTHER PUBLICATIONS

Todd, D. M., "Clean Coal Technologies for Gas Turbines", GE Turbine State-of-the-Art Technology Seminar, Jul. 1993, pp. 1–18.

Anand, A. K., et al., New Technology Trends for Improved IGCC System Performance, International Gas Turbine and Aeroengine Congress and Exposition, Houston, Texas, Jun. 5–8, 1995.

Rao, A. D., et al. Integration of Texaco TQ Gasification with Elevated Pressure ASU, 13th EPRI Conference on Gasification Power Plants, San Francisco, CA, Oct. 19–21, 1994.

Smith, A. R., et al., "Improved IGCC Power Output and Economics Incorporating a Supplementary Gas Turbine", 13th EPRI Conference on Gasification Power Plants, San Francisco, CA, Oct. 19–21, 1994.

*Primary Examiner*—Louis J. Casaregola
*Attorney, Agent, or Firm*—John M. Fernbacher

[57] ABSTRACT

An integrated gas turbine/air separation system is operated at or below full system load by feeding the air separation unit with air from a dedicated air feed compressor and optionally with extracted air from the gas turbine air compressor. When the gas turbine air compressor discharge drops below a selected pressure at part load conditions, the flow of extracted air to the air separation unit is discontinued and the air separation unit operates at constant pressure supplied only by the air feed compressor. This mode of operation is particularly useful in an integrated gasification combined cycle (IGCC) power generation system and allows the design of the oxygen and nitrogen product compressors such that the compressors operate at high efficiency during full load IGCC operation.

14 Claims, 6 Drawing Sheets

FIG. 1

FIG. 2
Gas Turbine And Air Separation Unit Performance Maps

FIG. 3
Air Separation Unit Main Air Compressor Operating Curve (Conventional Practice)

FIG. 4
Oxygen Compressor Operating Curve
(Conventional Practice)

OPERATION OF INTEGRATED GASIFICATION COMBINED CYCLE POWER GENERATION SYSTEMS AT PART LOAD

FIELD OF THE INVENTION

The invention pertains to the operation of an integrated gasification combined cycle power generation system and in particular to a method for operating the gas turbine and air separation unit when the power generation system operates at less than design load.

BACKGROUND OF THE INVENTION

The generation of electricity by advanced gasification combined cycle power generation systems offers the potential for reduced power cost and lower environmental impact than standard coal-fired power plants. In these advanced systems, coal or other carbonaceous material is gasified with oxygen and the produced gas is cleaned to yield a low-sulfur fuel gas. This fuel gas is utilized in a gas turbine generation system to produce electric power with reduced environmental emissions. The growing interest in gasification combined cycle (GCC) technology in recent years has been stimulated by the higher efficiency and demonstrated reliability of advanced gas turbines, coal gasification processes, and air separation systems which are utilized in integrated gasification combined cycle (IGCC) systems. The proper integration of these three main components of an IGCC system is essential to achieve maximum operating efficiency and minimum power cost.

A general review of the current art in GCC and IGCC power generation systems is given by D. M. Todd in an article entitled "Clean Coal Technologies for Gas Turbines" presented at the GE Turbine State-of-the-Art Technology Seminar, July 1993, pp. 1–18. A. K. Anand et al present a review of the factors involved in the design of IGCC systems in a paper entitled "New Technology Trends for Improved IGCC System Performance" presented at the International Gas Turbine and Aeroengine Congress and Exposition, Houston, Tex., Jun. 5–8, 1995. A review of various integration techniques and the impact thereof on GCC economics is given in a paper by A. D. Rao et al entitled "Integration of Texaco TQ Gasification with Elevated Pressure ASU" presented at the 13$^{th}$ EPRI Conference on Gasification Power Plants, San Francisco, Calif., Oct. 19–21, 1994.

In a paper entitled "Improved IGCC Power Output and Economics Incorporating a Supplementary Gas Turbine" presented at the 13$^{th}$ EPRI Conference on Gasification Power Plants, San Francisco, Calif., Oct. 19–21, 1994, A. R. Smith et al review several modes of integration between the gas turbine and the air separation unit in an IGCC process. In one mode, the air separation unit feed air is provided by a separate compressor and a portion of the nitrogen product from the air separation unit is compressed and introduced into the gas turbine combustor. This nitrogen-integrated mode allows operation of the IGCC system at increased gas turbine power output and reduced $NO_x$ formation. In an alternative operating mode, nitrogen integration is combined with air integration in which a portion of the feed air to the air separation unit is supplied by extracted air from the gas turbine compressor. This alternative mode, defined as air and nitrogen integration, gives greater operating flexibility and allows for a higher degree of optimization during IGCC system operation at part load and other off-design conditions.

Air- and nitrogen-integrated gas turbine/air separation systems are described by representative U.S. Pat. Nos. 3,731,495, 4,019,314, 4,224,045, 4,557,735, 4,697,415, 5,081,845, 5,386,686, 5,406,786, and 5,410,869, and UK patent Application 2 067 668 A.

Combustion-based power generation systems, including IGCC systems, are subject to periods of operation below system design capacity due to changes in ambient air temperature and/or the cyclic demand for electric power. During these periods, such systems operate below design efficiency. The equipment selection and process design of an IGCC system therefore must address steady-state operation at design capacity as well as operation at off-design, part load, or turndown conditions. The air- and nitrogen-integrated IGCC system described above is a preferred option because of the potential for operating such a system at maximum overall efficiency, particularly when the system also must operate at off-design, part load, or turndown conditions.

The invention disclosed below and defined by the claims which follow addresses the need for improved methods to operate advanced power generation systems, and in particular describes the improved operation of air- and nitrogen-integrated gas turbine and air separation systems at part load or turndown conditions.

SUMMARY OF THE INVENTION

The invention is a method of operating an integrated gas turbine/air separation system at part load which comprises compressing air in a gas turbine air compressor, combusting at least a portion of the resulting compressed air with a fuel in a gas turbine combustor to form hot combustion products, expanding the hot combustion products in a gas turbine expander which drives the compressor and optionally an electric generator. Air is separated into nitrogen-rich and oxygen-rich products in a cryogenic air separation unit wherein feed air to the air separation unit is provided by a main air compressor and optionally by an additional portion of compressed air from the gas turbine air compressor. The integrated gas turbine/air separation system is operated at part load such that (a) when the gas turbine air compressor supplies compressed air at a given operating pressure which is greater than a minimum air separation unit feed pressure, the air separation unit is operated at a feed pressure essentially equal to the given operating pressure and the feed air is provided to the air separation unit by the main air compressor with the additional portion of compressed air from the gas turbine air compressor; or (b) when the gas turbine air compressor supplies compressed air at a given operating pressure which is essentially equal to or less than the minimum air separation unit feed pressure, the air separation unit is operated at a feed pressure essentially equal to the minimum air separation unit feed pressure and the feed air to the air separation unit is provided by the main air compressor without additional compressed air from the gas turbine air compressor.

The minimum air separation unit feed pressure is between 80 and 500 psia.

The main air compressor operates in either of two modes such that (a) when the main air compressor operates at a discharge pressure which is greater than the minimum air separation unit feed pressure, the main air compressor is operated above its minimum design total relative compression ratio and below its maximum design relative suction volume flow; or (b) when the main air compressor operates at a discharge pressure which is essentially equal to the minimum air separation unit feed pressure, the main air compressor is operated essentially at its minimum design total relative compression ratio and at or below its maximum design relative suction volume flow.

The minimum design total relative compression ratio and the maximum design relative suction volume flow of the main air compressor occur essentially at the minimum air separation unit feed pressure. The main air compressor operates at a discharge pressure between 80 and 600 psia.

The oxygen-rich product is compressed in an oxygen compressor which operates in either of two modes such that (a) when the main air compressor operates at a discharge pressure which is greater than the minimum air separation unit feed pressure, the oxygen compressor is operated below its maximum design total relative compression ratio and below its maximum design relative suction volume flow; or (b) when the main air compressor operates at a discharge pressure which is essentially equal to the minimum air separation unit feed pressure, the oxygen compressor is operated essentially at its maximum design total relative compression ratio and at or below its maximum design relative suction volume flow.

The maximum design total relative compression ratio and the maximum design relative suction volume flow of the oxygen compressor occur when the main air compressor operates at a discharge pressure which is essentially equal to the minimum air separation unit feed pressure. The oxygen compressor operates at a discharge pressure between 120 and 2000 psia.

Fuel gas for the gas turbine combustor can be generated in a process for gasifying a carbonaceous feedstock with compressed oxygen-rich product from the air separation unit.

At least a portion of the nitrogen-rich product can be compressed in a nitrogen compressor for use in the process for gasifying the carbonaceous feedstock. The nitrogen compressor operates in either of two modes such that (a) when the main air compressor operates at a discharge pressure which is greater than the minimum air separation unit feed pressure, the nitrogen compressor is operated below its maximum design total relative compression ratio and below its maximum design relative suction volume flow; or (b) when the main air compressor operates at a discharge pressure which is essentially equal to the minimum air separation unit feed pressure, the nitrogen compressor is operated essentially at its maximum design total relative compression ratio and at or below its maximum design relative suction volume flow.

The maximum design total relative compression ratio and the maximum design relative suction volume flow of the nitrogen compressor occur when the main air compressor operates at a discharge pressure which is essentially equal to the minimum air separation unit feed pressure. The nitrogen compressor operates at a discharge pressure between 50 and 2000 psia.

At least a portion of the nitrogen-rich product can be compressed in a nitrogen compressor and introduced into the gas turbine combustor. In this option, the nitrogen compressor operates in either of two modes such that (a) when the main air compressor operates at a discharge pressure which is greater than the minimum air separation unit feed pressure, the nitrogen compressor is operated below its maximum design total relative compression ratio and below its maximum design relative suction volume flow; or (b) when the main air compressor operates at a discharge pressure which is essentially equal to the minimum air separation unit feed pressure, the nitrogen compressor is operated essentially at its maximum design total relative compression ratio and at or below its maximum design relative suction volume flow.

The maximum design total relative compression ratio and the maximum design relative suction volume flow of the nitrogen compressor occur when the main air compressor operates at a discharge pressure which is essentially equal to the minimum air separation unit feed pressure. The nitrogen compressor operates at a discharge pressure between 120 and 2000 psia.

By designing the air separation unit feed and product compressors as described by the invention, the gas turbine system operates at part load with a slight penalty in total power consumption for the air separation unit. However, because the main air compressor, oxygen product compressor, and nitrogen product compressors are designed to operate over a relatively narrow range of compression ratio and suction volume flow, the compressor efficiencies at the gas turbine system full load design capacity (where the system operates most of the time) are maximized and the total power consumption for the air separation unit is minimized.

DETAILED DESCRIPTION OF THE INVENTION

The invention relates to integrated gas turbine/air separation systems in which the gas turbine and air separation units are linked by the transfer of at least one gas stream from one system to the other. For example, in an air-integrated gas turbine/air separation system some or all of the compressed air feed to the air separation unit is provided by the gas turbine compressor during at least a portion of the system operating time. In a nitrogen-integrated gas turbine/air separation system some or all of the nitrogen product from the air separation unit is introduced into the gas turbine combustor during at least a portion of the system operating time.

Figure 1:
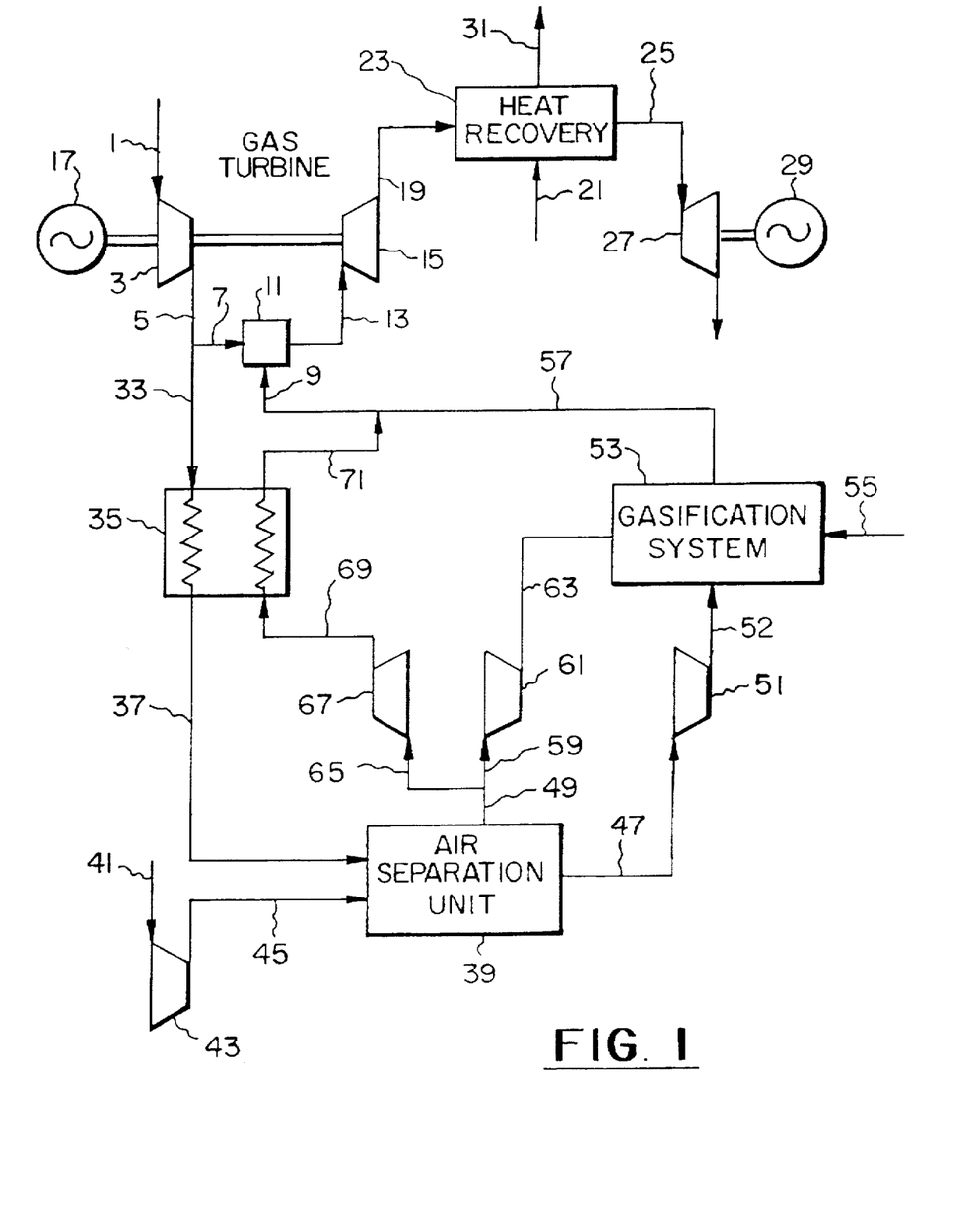
FIG. 1 is a flow diagram of an integrated gasification combined cycle power generation system with air and nitrogen integration.

Air and nitrogen integration is preferred for use in integrated gasification combined cycle (IGCC) systems in many applications because of the potential for operation at maximum overall efficiency, particularly when the system operates at part load or turndown conditions for certain periods of time. An air- and nitrogen-integrated IGCC process is illustrated in FIG. 1 wherein ambient air 1 is compressed in gas turbine air compressor 3, which is typically an axial flow adiabatic compressor, to 150 to 450 psia at 600° F. to 900° F. A portion 7 of compressed air 5 is combusted with fuel 9 in gas turbine combustor 11 to yield combustion product stream 13 typically at 2000° F. to 2800° F. Fuel 9 preferably is a gaseous fuel such as synthesis gas or natural gas, although liquid fuels may be utilized as well. Combustion product stream 13 is expanded in gas turbine expander 15 to generate shaft power which drives compressor 3 and electric generator 17. Optionally, turbine exhaust 19 at 0.2 to 2 psig and 900° F. to 1100° F. is cooled against boiler feedwater 21 in heat recovery zone 23 to generate steam 25 which is expanded in steam turbine 27 to drive additional electric generator 29. Generators 17 and 29 may be combined in a single unit. Final exhaust 31 is discharged to the atmosphere.

Extracted air 33, which is the remaining portion of compressed air 5, is cooled against nitrogen stream 69 (later defined) in heat exchange zone 35 to 300° F. to 900° F. and provides feed air 37 to air separation unit 39. The remaining feed air is provided by compressing air 41 in main air compressor 43 to provide feed air 45 to air separation unit 39. Main air compressor 43 is an intercooled centrifugal machine which provides feed air 45 at 40° F. to 120° F. and essentially the same pressure as cooled extracted air 37.

In usual design practice, the amount of extracted air 33 as a percentage of the total air separation unit feed requirement is fixed for a given ambient air temperature. The term 50% extracted air, for example, means that extracted air 33 provides 50% of the total feed air to air separation unit 39, and the remaining 50% is supplied by main air compressor 43. 100% extracted air means that all feed air for air separation unit 39 is supplied from gas turbine air compressor 3 and air from main air compressor 43 is not required.

Extracted air 37 and feed air 45 flow to cryogenic air separation unit 39 wherein impurities are removed from the air, and the air is cooled, condensed, and distilled to yield oxygen product 47, typically containing 80 to 99.9 vol % oxygen, and nitrogen product 49, typically containing 96 to 99.9 vol % nitrogen. Oxygen product 47 is compressed to 200 to 1200 psia in oxygen compressor 51 to provide oxygen to gasification system 53 which converts carbonaceous feedstock 55 into fuel gas 57 comprising chiefly hydrogen and carbon monoxide.

Cryogenic air separation processes for use in ICGG systems are well-known, and representative processes are described in U.S. Pat. Nos. 4,224,045, 5,081,845, and 5,224,336. Commercially-available gasification systems for this application have been developed by Texaco, Shell, BG-Lurgi, Prenflo, HTW, and Destec. Such feedstocks include coal, coke, vacuum residua, and other heavy hydrocarbons. A portion 59 of nitrogen product 49 is compressed to 50 to 2000 psia in nitrogen compressor 61 to provide compressed nitrogen 63 for purging, soot blowing, and coal conveying in gasification system 53.

The present invention is not restricted to IGCC systems as described above, and can be used for any air-integrated combustion turbine/air separation system which operates below design capacity for certain periods of time. In an alternative mode of operation, referring to FIG. 1, gasification system 53 is not used and compressed oxygen product 52 is provided at pressure for external use. Optionally, nitrogen 59 is compressed in nitrogen compressor 61 to provide product nitrogen 63 for external use. Optionally and preferably, nitrogen 65 is combined with fuel 57 and introduced into combustor 11 as fuel-nitrogen mixture 9 or compressed in nitrogen compressor 67 and introduced directly into combustor 11 (not shown). Fuel 57 is provided from an external source, for example as natural gas. Optionally, electric generators 17 and 29 are not utilized and the integrated system is operated only to produce oxygen 52 and/or nitrogen 63. In this case compressor 3, combustor 11, expansion turbine 15, and steam turbine 27 would be sized to provide only the power required for the air separation system. For any of these alternatives, during operation of the gas turbine system at part load or turndown conditions, air separation unit 39 will operate according to the description given above.

Fuel gas 57 provides fuel 9 at a pressure of 200 to 600 psia and typically has a heating value of 150 to 450 BTU/SCF when produced by gasifier 53 or about 1000 BTU/SCF when provided as natural gas. Another portion 65 of nitrogen product 49 is compressed to 150 to 600 psia in nitrogen compressor 67, warmed against extracted air 33 in heat exchange zone 35, and combined with fuel gas 57 to yield fuel-nitrogen mixture for introduction into gas turbine combustor 11. Alternatively, warm compressed nitrogen 71 can be introduced directly into combustor 11. The use of warm compressed nitrogen 71 in the gas turbine reduces the formation of nitrogen oxides in combustor 11 and increases power output of expansion turbine 15.

Designing a commercial IGCC power plant which uses the process described above is an iterative process which involves the optimum selection of the gas turbine, air separation, and gasification systems to satisfy the operating requirements for power generation. These requirements include the design capacity as a function of ambient temperature for the actual plant location, the design maximum ambient temperature, the design maximum power output, the maximum gas turbine firing temperature, the amount of extracted air, the daily and seasonal power demand profiles, the relative importance of capital vs. operating costs for the project, and other requirements.

The object of the present invention is to determine the proper amount of air extraction, the preferred operating mode of the air separation unit, and the required design points for the air separation unit feed and product compressors which will allow optimum gas turbine/air separation unit operation during swings in gas turbine output as a result of lower power demand and/or changes in ambient air temperature.

Operation of a gas turbine at less than design power output is defined herein as part load or turndown operation. Two operating variables can reduce the power output of the gas turbine in the IGCC process of FIG. 1. The first of these is an increase in ambient air temperature, which decreases the density of feed air 1 and in turn reduces the mass flow of compressed air 5 and the amount of compressed air 33 which can used for feed to air separation unit 39. In order to operate below the maximum temperature limitation of gas turbine expander 15, the firing rate of combustor 11 must be reduced by decreasing the flow of fuel 9. This in turn reduces the mass flow of combustion products 13 and the power output of expander 15. As a result, a 10° C. increase in ambient air temperature can reduce power output by 4% for a typical IGCC system.

The second operating variable which decreases the power output of the gas turbine in the IGCC system is the reduction in power demand which occurs in the typical daily power demand cycle. For example, the nighttime power demand on a typical IGCC plant can be 50–75% of the daytime demand. Seasonal changes in power demand also may occur. During reduced power demand, the plant must be operated at part load (i.e. "turned down") by decreasing the flow of air and fuel to the gas turbine combustor. Gas turbine air compressor 3 can be turned down by throttling inlet air 1 using guide vanes at the inlet of compressor 3 or by recirculating air within the compressor system. As a result, the mass flow and the pressure of compressor discharge 5 decrease, which reduces the pressure of extracted air 37 to air separation unit 39. This in turn requires that main air compressor 43 must operate at a reduced discharge pressure, and air separation unit 39 therefore must operate at a lower pressure which decreases the pressure of oxygen product 47 and nitrogen product 49. However, gasification system 53 typically operates at a fixed pressure, so that oxygen compressor 51 and nitrogen compressor 61 must operate at higher compression ratios at turndown conditions. Because less fuel 57 is required at turndown, less oxygen 47 is required by gasification system 53, and therefore less feed air is required by air separation unit 39.

As stated earlier, it is current design practice to fix the air extraction rate for a given ambient air temperature and design load. During turndown the feed for air separation unit 39 continues to be provided by both extracted air 37 and compressed feed air 45. Main air compressor 43 therefore must be designed to operate over wide ranges of air flow and compression ratio in order to cover the entire IGCC operating range between full design capacity and maximum turndown. As the operating pressure of air separation unit 39 varies over this wide range, the suction pressures of oxygen and nitrogen compressors 51, 61, and 67 also vary; since the discharge pressures of these compressors are essentially constant, the compression ratios vary widely. In addition, the mass flow handled by these compressors decreases as turndown occurs. In some operating situations at certain combinations of low ambient temperature and IGCC turndown, it may be necessary to shut down main air compressor 43 and supply the air separation unit completely by extracted air 37.

Figure 2:
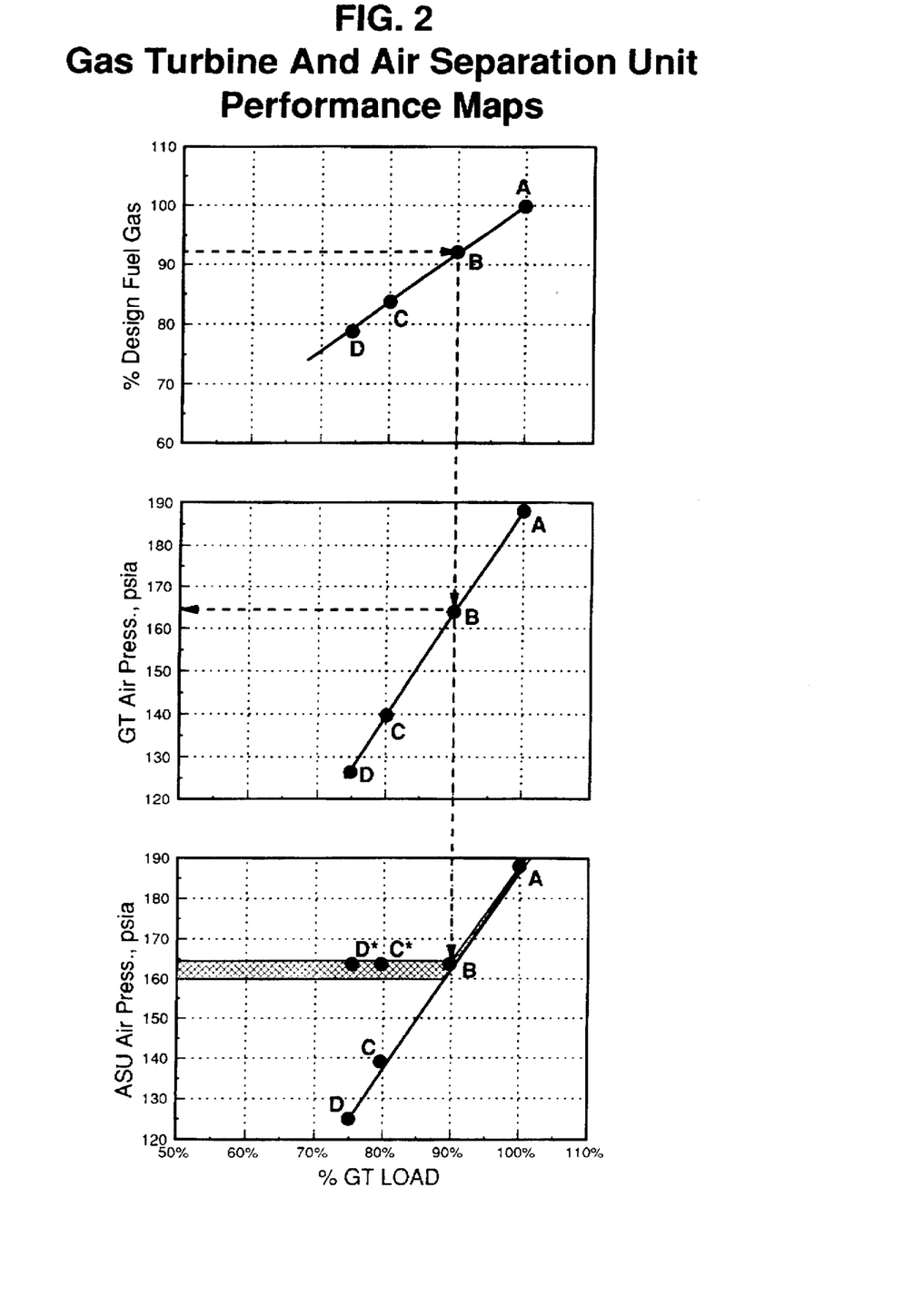
FIG. 2 is a performance map for the operation of the integrated gasification combined cycle power generation system of FIG. 1 at or below design capacity.

The relationship among the IGCC system operating capacity, the gas turbine operation, and the air separation unit operation at full and part load conditions is illustrated in FIG. 2 for a typical IGCC operation at a constant ambient temperature. In this performance map, the % of gas turbine (GT) design fuel gas capacity, gas turbine (GT) air compressor discharge pressure, and air separation unit (ASU) operating pressure are plotted against the % of design load for the gas turbine (GT) system. The slopes of these operating lines are characteristic of a particular gas turbine system design and ambient conditions. At point A, which represents the design IGCC system gas turbine power output, gas turbine air compressor 3 operates at a discharge pressure of 190 psia and air separation unit 39 operates at the same pressure, which means that the discharge pressure of main air compressor 43 is also 190 psia. As the gas turbine is turned down and operated at successively lower outputs as defined by points B, C, and D in the upper graph of FIG. 2, the gas turbine air compressor discharge pressure will decrease according to points B, C, and D in the middle graph, and as a result the air separation unit must operate at the same decreasing pressure levels as shown by points B, C, and D in the lower graph. Since the air extraction rate is determined according to the usual design practice, and since the total air feed to the air separation unit decreases due to lower oxygen demand, the throughput of air through main air compressor 43 and the mass flow of extracted air 37 will decrease.

Figure 3:
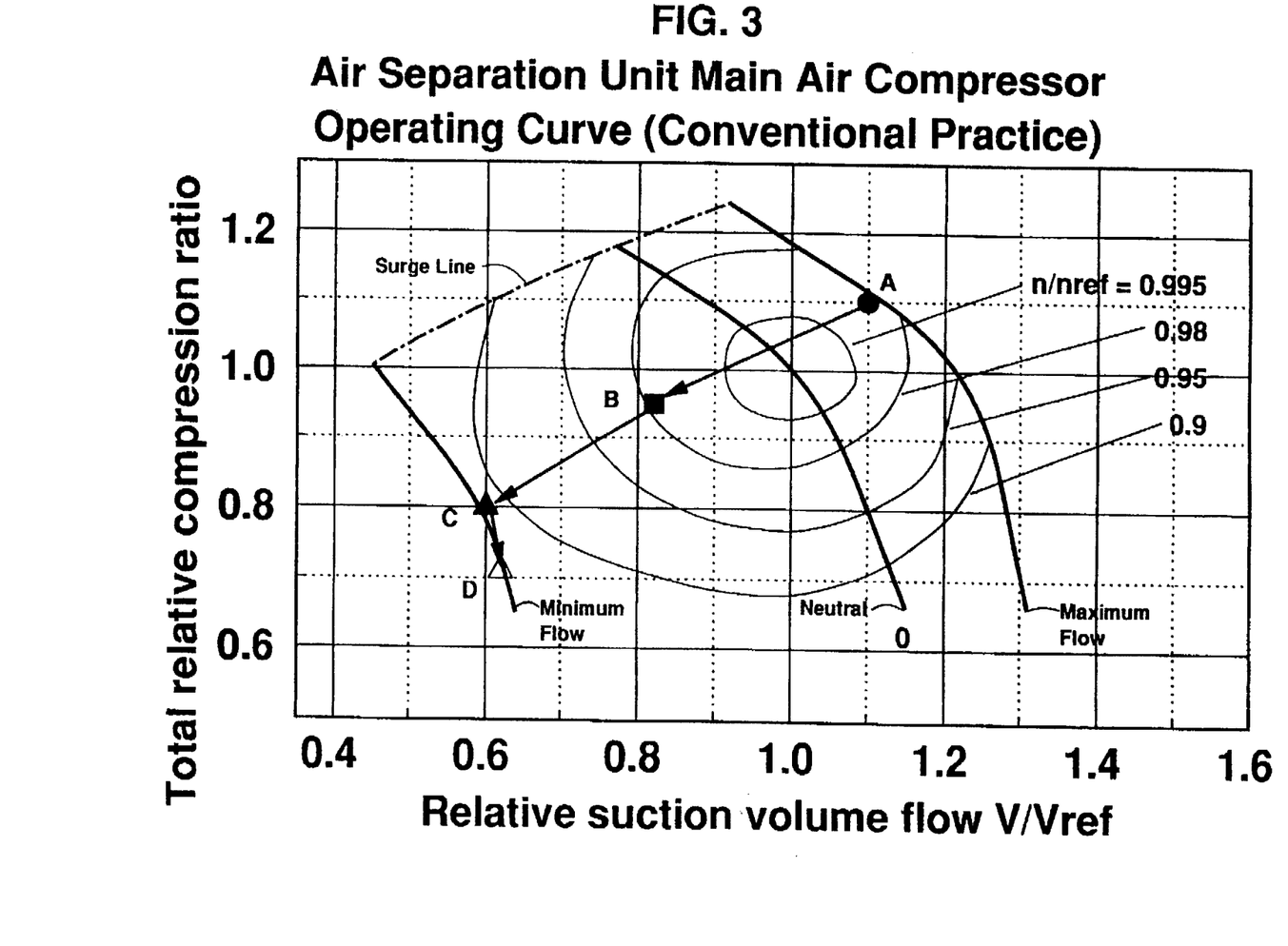
FIG. 3 provides compressor operating curves for the air separation main air compressor operating over a full range of compressor operation according to conventional practice.

The standard practice of varying pressure and flow of extracted air 33 over the entire gas turbine operating range therefore requires that compressors 43, 51, 61, and 67 associated with air separation unit 39 be designed to operate over wide ranges of volumetric flow and compression ratios corresponding to the operating points A through D in FIG. 2. This is illustrated in FIG. 3 which gives compressor operating curves for main air compressor 43 operating over a full range of flow and compression ratio corresponding to operation of the integrated IGCC system from points A to D described in FIG. 2.

In the present specification and appended claims, two pressures are considered essentially equal if they are within 5 psi, and a pressure is considered essentially constant if it varies less than about 1% on an absolute pressure basis. The term "relative compression ratio" means the compression ratio of a compressor at any operating point divided by the compression ratio at a selected design point. The term "relative suction volume flow" is defined as the actual volumetric flow at the compressor inlet at any operating point divided by the actual volumetric flow at the compressor inlet at a selected design point. The compressor operating curves of FIGS. 3 to 6 for constant ambient temperature indicate lines of constant relative efficiency which is defined as the actual compressor efficiency divided by the efficiency at a fixed reference condition, $n/n_{ref}$. The efficiency curves are bounded at higher compression ratios by the compressor surge line as shown. At low relative suction volume flow, the efficiency curves are bounded by the minimum flow curve which represents compressor operation when the compressor guide vanes are closed to the maximum degree possible. At higher relative suction volume flow, the efficiency curves are bounded by the maximum flow curve which represents compressor performance when the guide vanes are reversed in the maximum flow configuration. The neutral guide vane opening curve as shown passes through the reference point at which the relative suction volume flow and total relative compression ratio are 1.0.

Referring again to FIG. 3, at the design operating capacity of the gas turbine system, main air compressor 43 operates at point A at maximum throughput with inlet guide vanes in the maximum flow position. The relative compressor efficiency for point A is about 0.985. As the IGCC system is operated at decreasing capacity due to reduced power demand, the air compressor operation moves to point B as the relative suction volume flow and total relative compression ratio decrease as earlier described. As further turndown occurs, the compressor operating condition moves to point C and finally to point D, which is the compressor minimum operating capacity with compressor guide vanes closed as far as mechanically possible. Thus compressor efficiency is high at maximum capacity represented by point A and low at extreme turndown conditions represented by points C and D.

Figure 4:
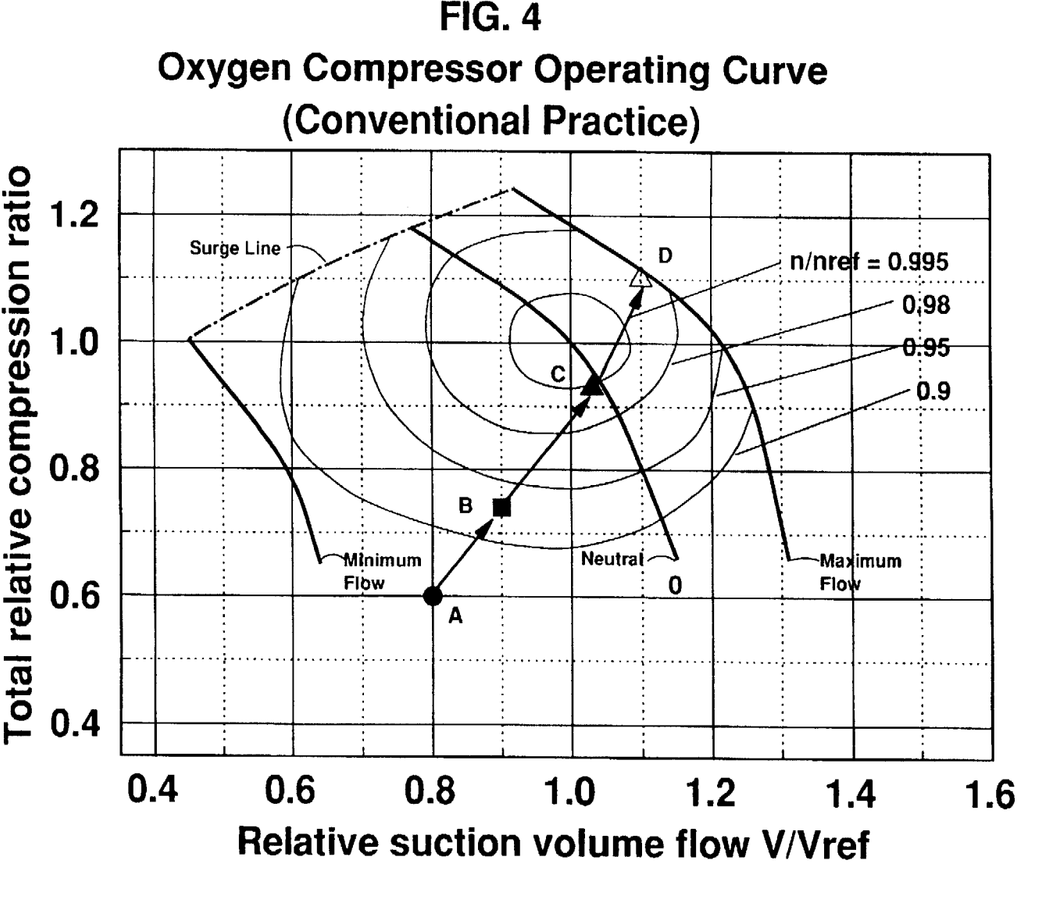
FIG. 4 provides compressor operating curves for the air separation product oxygen compressor operating over a full range of compressor operation according to conventional practice.

FIG. 4 gives compressor operating curves for oxygen product compressor 51 operating over a full range of flow and compression ratios corresponding to the gas turbine system operating range described above for FIG. 3. At the design operating capacity of the system, the oxygen product compressor operates at point A. As turndown increases, the oxygen compressor operation moves successively to points B and C, and finally to point D at maximum turndown, at which point the compressor operates at maximum volumetric throughput with the compressor guide vanes in the maximum flow position. In order to allow compressor operability over the entire turndown range, the compressor must operate at point A in a region of low relative efficiency at gas turbine system design operating capacity.

As a result of this required wide design range, oxygen product compressor 51 operates at high efficiency at maximum turndown and low efficiency at normal system design capacity. This is an undesirable operating situation, since the compressor will perform at a low efficiency for a considerable fraction of the onstream time. Similar problems occur with nitrogen product compressors 61 and 67, which have operating curves similar to FIG. 3.

The present invention addresses this undesirable operating situation by limiting the use of extracted air to a portion of the turndown region defined between points A (gas turbine design capacity or full load) and B of FIG. 2, and supplying air to the air separation unit only by main air compressor 43 at gas turbine operating loads below Point B. The air separation unit operates at a relatively constant pressure in the turndown region below point B, for example in the range of 160 to 165 psia as shown, and no extracted air is used for air separation unit feed. Since all air from gas turbine air compressor 3 in this operating mode would pass to combustor 11, the firing temperature may decrease since less fuel 9 is being fired at turndown; however, mass flow through combustion turbine 15 would be higher and the efficiency of the expansion turbine would not suffer appreciably.

Thus in the present invention the air separation unit operates between points A and B in the lower graph of FIG. 2 at decreasing pressure with feed air supplied by main air compressor discharge 45 and extracted air 37. Between points B and D* (maximum turndown) air separation unit 39 and main air compressor 43 operate at essentially constant pressure. Gas turbine air compressor 3 will still operate between points A and D in the middle graph of FIG. 2, but between points B and D the flow of extracted air 37 will be zero and all compressed air 5 would pass to combustor 11. Point B is defined by the preferred minimum operating pressure of air separation unit 39, which for the example in FIG. 2 is between 160 and 165 psia. This minimum pressure will vary with gas turbine and air separation unit design requirements, and typically will be in the range of 120 to 260 psig.

By operating the air separation unit at or above a selected minimum operating pressure during turndown, the pressure of oxygen and nitrogen products 47 and 49 will be higher for the present invention than for the typical operating practice between points B and D (FIG. 2). Between the operating points B, C*, and D* for the present invention (FIG. 2), the oxygen and nitrogen product pressures and the air separation feed pressure will be essentially constant, in contrast with decreasing pressures between operating points B, C, and D as in typical operating practice. This feature of the invention allows the operation of main air compressor 43 and product compressors 51, 61, and 67 over a much narrower range of compression ratios. This in turn enables more efficient compressor operation as described below.

Figure 5:
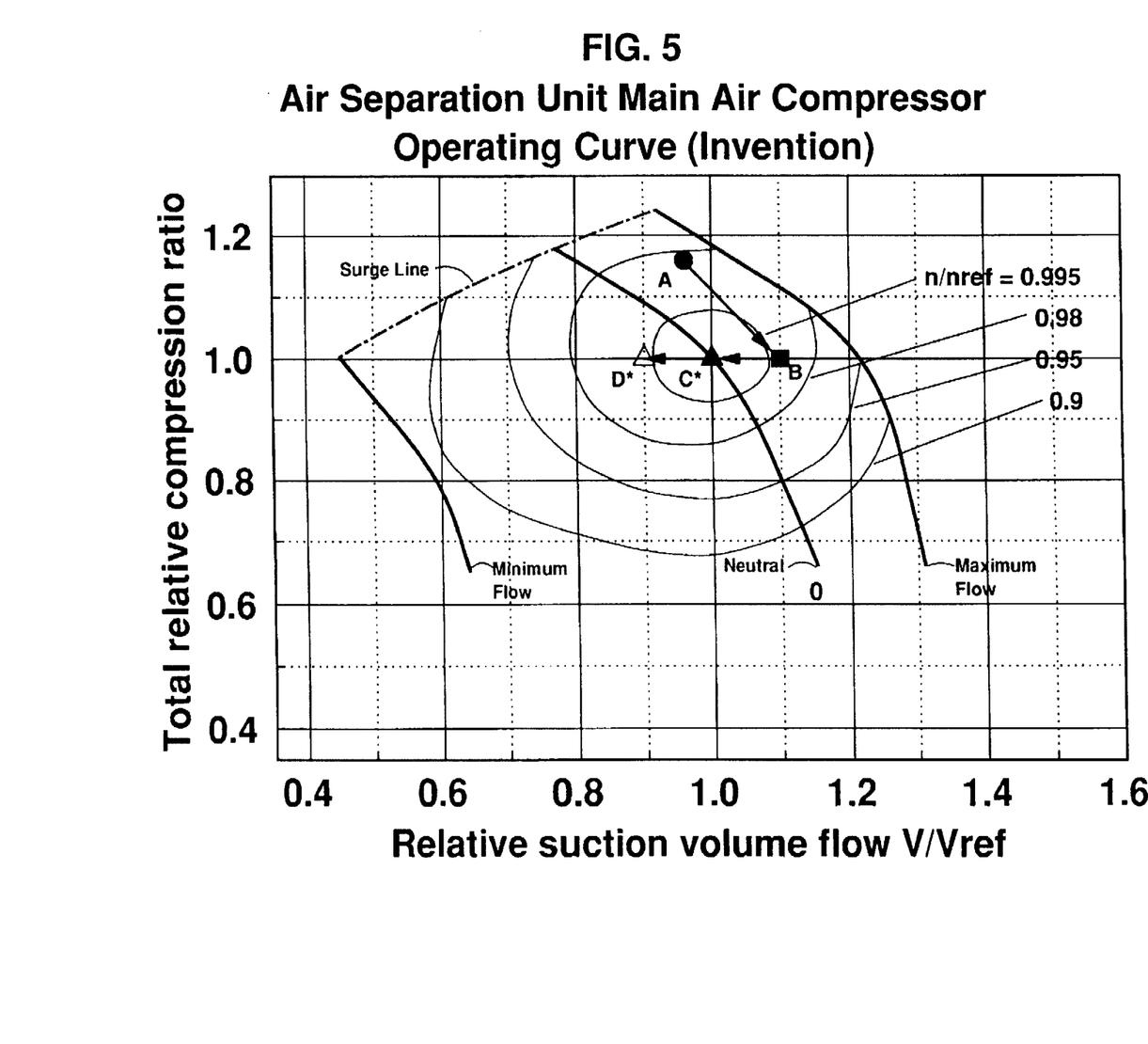
FIG. 5 provides compressor operating curves for the air separation main air compressor operating over the range of the present invention.

FIG. 5 gives compressor operating curves for main air compressor 43 designed to operate according to the present invention. At full design gas turbine operating capacity, the compressor operates at point A, and as turndown occurs the compressor operates between points A and B (these points correspond to points A and B in FIG. 2). Between points B, C*, and D* the compressor operates at a constant discharge pressure and compression ratio. The minimum design total compression ratio is defined as the compression ratio when the compressor operates between points B, C*, and D*. The maximum design relative suction pressure is defined by Point B.

Figure 6:
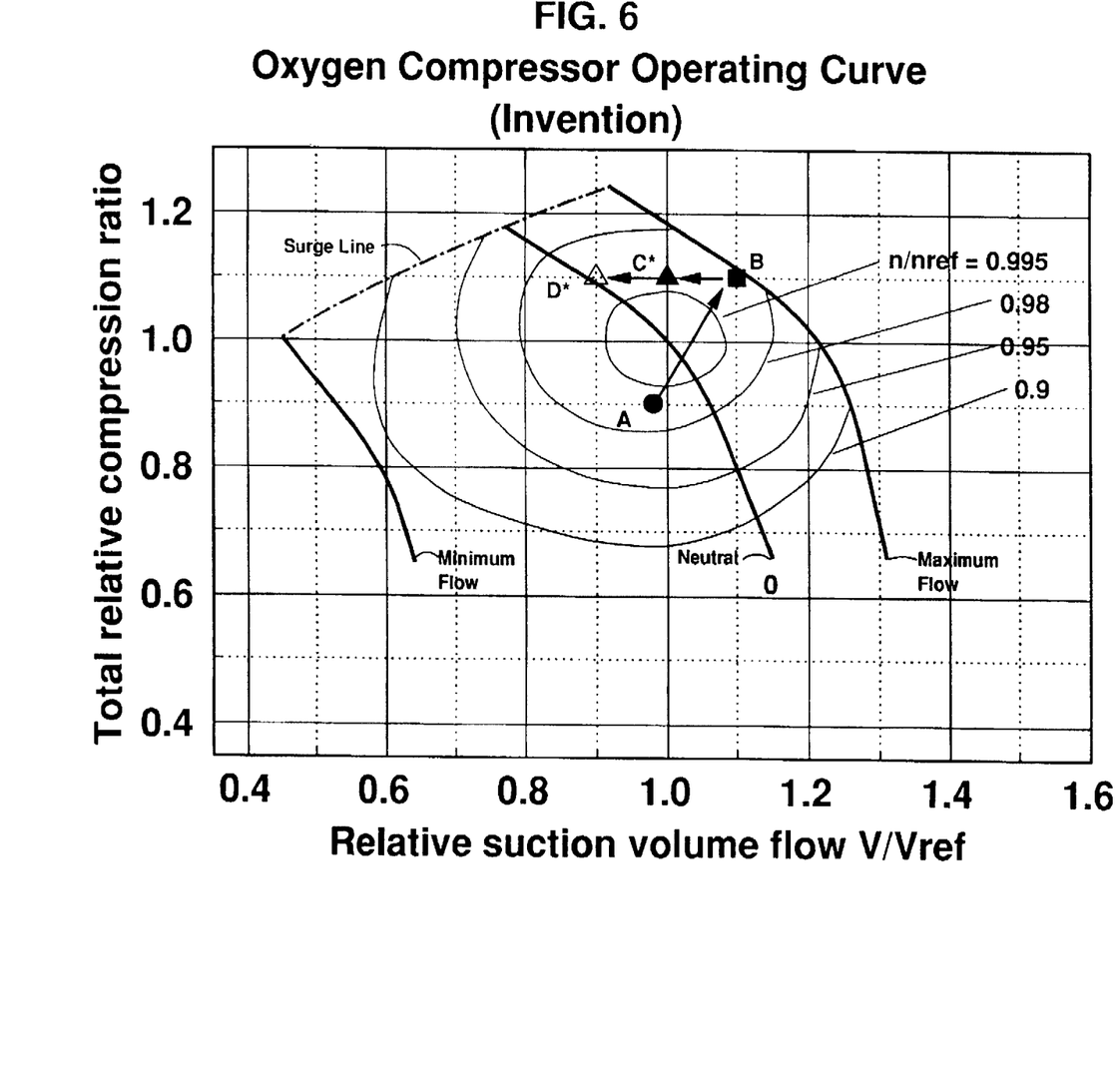
FIG. 6 provides compressor operating curves for the air separation product oxygen compressor operating over the range of the present invention.

FIG. 6 gives compressor operating curves for oxygen product compressor 51 designed to operate according to the present invention. At full design IGCC operating capacity, the compressor operates at point A, and as turndown proceeds the compressor operates between points A and B (these points correspond to points A and B in FIG. 2). Between points B, C*, and D* the compressor operates at a constant discharge pressure and compression ratio. The maximum design total relative compression ratio is defined as the ratio when operating between points B, C*, and D*. Point B defines the maximum design relative suction volume flow. The relative operating efficiency at point A (which occurs for the largest fraction of IGCC operating time) is about 0.99 according to the present invention. In contrast, the relative efficiency at the corresponding point A in FIG. 4, which describes typical operation at design gas turbine capacity without use of the present invention, is only about 0.85. Thus the method of the present invention allows the design and operation of the oxygen product compressor over a narrower range of total relative compression ratio and relative suction volume flow, which in turn enables more efficient overall operation of the compressor.

When air extraction is used over the entire range of gas turbine and air separation system turndown according to usual practice, nitrogen product compressors 61 and 67 will exhibit operating characteristics similar to those of oxygen product compressor 51 as illustrated in FIG. 4. When air separation unit 39 is operated according to the present invention, nitrogen product compressors 61 and 67 can be designed and operated in the same manner as oxygen product compressor 51 illustrated in FIG. 6. Thus higher operating efficiencies can be realized for all three product compressors 51, 61, and 67 according to the present invention when the gas turbine system operates at design capacity. The definitions of maximum design total relative compression ratio and maximum design relative suction volume flow for nitrogen compressors 61 and 67 are the same definitions given above for oxygen product compressor 51.

Prior methods to improve the efficiencies of gas turbines and air separation units in IGCC systems are extensive, but it was not realized that limiting the air extraction from the gas turbine compressor to the air separation unit during turndown and increasing the role of the air separation unit main air compressor can improve overall efficiency and reduce cost of electricity. This is an unexpected conclusion in view of the prior art, since during turndown according to the present invention the combustion turbine may operate somewhat inefficiently (extracted air may be vented or a lower combustor firing temperature may occur) and the standalone air separation compressor must share more of the load. Operation of the air separation unit product compressors is less severe in the present invention; since turndown operation determines compressor selection, these compressors can be designed for more efficient full load operation.

EXAMPLE

The IGCC system of FIG. 1 was simulated to compare the overall efficiency of the air separation plant operation according to (1) current practice in which the feed to air separation unit 39 includes some extracted air 37 over the entire air separation unit operating range and (2) operation according to the present invention in which air extraction is used only above an air separation unit feed pressure of 147 psia). In this Example, turndown occurs in most cases because of changes in ambient temperature as will be seen below. At design capacity (analogous to point A in FIGS. 3–6) the average actual compression ratios are as follows: 13.0 for gas turbine compressor 3, 13.0 for main air compressor 43, 10.0 for oxygen compressor 51, and 5.0 for return nitrogen compressor 67. At maximum turndown or minimum flow, analogous to point D in FIG. 2, the average actual compression ratios are as follows: 9.0 for gas turbine compressor 3, 9.0 for main air compressor 43, 18.0 for oxygen compressor 51, and 6.5 for return nitrogen compressor 67. These compression ratios are representative of "F" technology gas turbines. Air separation unit 39 is sized to provide the necessary oxygen and nitrogen for the IGCC system with no export of product oxygen or nitrogen. The IGCC system operates at ambient temperatures of 23°, 41°, 59°, 75°, and 95° F. and the compressor efficiencies are calculated for main air compressor 43, oxygen product compressor 51, and return nitrogen compressor 67 for each of these temperatures at full load and for selected temperatures at part load.

The calculated results for operation according to current practice (air extraction to the air separation unit over the entire gas turbine operating range) are given in Table 1 and calculated results for operation according to the present invention (air extraction to the air separation unit only above air separation unit feed pressure of 147 psia) are given in Table 2. The relative compressor efficiencies for the two cases and three compressors were determined at full load at 41°, 59°, and 95° F. and the results are summarized in Tables 1 and 2. It is seen that relative efficiencies for the main air compressor are slightly less for the invention than for current design practice, but are significantly higher for the oxygen and nitrogen compressors in the present invention.

The relative efficiencies at full load for each compressor were averaged for ambient temperatures of 41°, 59°, and 95° F., and these average efficiencies were used to calculate the average efficiency ratio for each compressor. This average efficiency ratio is defined as the average relative efficiency for the method of the present invention divided by the average relative efficiency for current practice. The total power consumption for each of the three air separation unit compressors was calculated for the case in which the compressors are designed to operate according to the current practice of air extraction to the air separation unit over the entire IGCC operating range, and the results were normalized to give the relative power consumption of each compressor. Next, the average efficiency ratios determined above were utilized with the relative power consumption to calculate the relative power consumption for each of the compressors designed according to the present invention. The results are given in Table 3 and show that at full load IGCC design capacity the overall power consumed by the air separation unit according to the present invention is 3.3% lower than the corresponding consumption when the unit is operated according to current practice.

TABLE 1

COMPRESSOR OPERATING DATA ACCORDING TO CURRENT PRACTICE

| Compressor (FIG. 1) | IGCC Load | Ambient Temperature (deg. F.) | Relative Total Compression Ratio | Relative Suction Volume Flow | Relative Efficiency |
|---|---|---|---|---|---|
| Main Air Compressor (43) | Full | 95 | 1.000 | 1.200 | 96.0 |
| | Full | 59 | 1.034 | 0.919 | 99.5 |
| | Full | 41 | 1.023 | 0.815 | 98.2 |
| | Full | 23 | 1.000 | 0.805 | 98.1 |
| | Part | 75 | 0.739 | 0.814 | 92.0 |
| | Part | 41 | (1) | (1) | (1) |
| Oxygen Product Compressor (51) | Full | 95 | 0.639 | 0.850 | 85.0 |
| | Full | 59 | 0.612 | 0.848 | 85.0 |
| | Full | 41 | 0.621 | 0.862 | 85.0 |
| | Full | 23 | 0.639 | 0.846 | 85.0 |
| | Part | 75 | 0.942 | 1.006 | 99.5 |
| | Part | 41 | 1.100 | 1.100 | 99.0 |
| Nitrogen Product Compressor (67) | Full | 95 | 0.819 | 0.839 | 95.0 |
| | Full | 59 | 0.801 | 0.837 | 95.0 |
| | Full | 41 | 0.807 | 0.851 | 95.0 |
| | Full | 23 | 0.819 | 0.835 | 95.0 |
| | Part | 75 | 1.007 | 1.002 | 100.0 |
| | Part | 41 | 1.100 | 1.100 | 99.0 |

(1) Main Air Compressor shut down and all air feed obtained from gas turbine

TABLE 2

COMPRESSOR OPERATING DATA ACCORDING TO PRESENT INVENTION

| Compressor (FIG. 1) | IGCC Load | Ambient Temperature (deg. F.) | Relative Total Compression Ratio | Relative Suction Volume Flow | Relative Efficiency |
|---|---|---|---|---|---|
| Main Air Compressor (43) | Full | 95 | 1.000 | 1.200 | 96.0 |
| | Full | 59 | 0.944 | 0.883 | 99.0 |
| | Full | 41 | 0.903 | 0.790 | 97.0 |
| | Full | 75 | 1.000 | 1.202 | 96.0 |
| | Part | 41 | 0.754 | 0.631 | 85.0 |
| Oxygen Product Compressor (51) | Full | 95 | 0.794 | 0.844 | 95.0 |
| | Full | 59 | 0.876 | 0.953 | 96.0 |
| | Full | 41 | 0.920 | 1.010 | 99.4 |
| | Full | 75 | 0.810 | 0.872 | 97.0 |
| | Part | 41 | 1.100 | 1.100 | 99.0 |
| Nitrogen Product Compressor (67) | Full | 95 | 0.949 | 0.845 | 96.0 |
| | Full | 59 | 1.008 | 0.954 | 99.7 |
| | Full | 41 | 1.056 | 1010 | 99.6 |
| | Full | 75 | 0.949 | 0.872 | 97.0 |
| | Part | 41 | 1.100 | 1.100 | 97.0 |

TABLE 3

AIR SEPARATION UNIT
RELATIVE TOTAL POWER CONSUMPTION AT IGCC FULL LOAD

| Compressor (FIG. 1) | Relative Total Power, Current Practice (%) | Average Efficiency Ratio | Relative Total Power, Present Invention (%) |
|---|---|---|---|
| Main Air Compressor (43) | 37.6 | 1.006 | 37.8 |
| Oxygen Product Compressor (51) | 15.6 | 0.878 | 13.7 |
| Nitrogen Product Compressor (67) | 46.8 | 0.966 | 45.2 |
| TOTAL | 100 | | 96.7 |

Relative Total Power (present invention) = Relative Total Power (current practice) × Average Efficiency Ratio As can be seen from the relative efficiencies in Table 1, the overall power consumption using the method of the present invention would be slightly higher at part load conditions, but since part load occurs for a small fraction of the time, the higher efficiencies at full load will be experienced for a major fraction of the time.

In the above Example, operation of the IGCC system using the present invention yields an air separation power reduction of 3.3% at full load conditions compared with current practice. For a 400 MW power plant in which the air separation unit consumes 50 MW, a 3.3% reduction in air separation plant power is 1.65 MW, which at an energy cost of $0.05/KWH is equal to $723,000 in annual savings.

Thus the present invention allows the air separation unit of an IGCC power generation system to operate in a more efficient manner compared with operation according to current practice. Because the air separation unit compressors are designed to operate over a narrower range of compression ratios, more efficient overall operation is realized chiefly because the oxygen and nitrogen product compressors operate at high efficiency when the IGCC system operates at full design load. When product compressors must be designed to operate over a wide range of compression ratios, which is the case when extracted air is utilized across the entire IGCC operating range, these compressors operate at significantly lower efficiencies when the IGCC system operates at full load. In addition, by operating the air separation unit continuously over the entire range of IGCC loads, the inefficiencies associated with startup and shutdown of the main air compressor for the air separation unit are avoided.

The essential characteristics of the present invention are described completely in the foregoing disclosure. One skilled in the art can understand the invention and make various modifications without departing from the basic spirit thereof, and without departing from the scope and equivalents of the claims which follow.

We claim:

1. A method of operating an integrated gas turbine/air separation system at part load which comprises compressing a first stream of air in a gas turbine air compressor, combusting at least a portion of the resulting compressed air with a fuel in a gas turbine combustor to form hot combustion products, expanding the hot combustion products in a gas turbine expander which drives the compressor, separating air into nitrogen-rich and oxygen-rich products in a cryogenic air separation unit wherein feed air to the air separation unit is provided at least in part by compressing a second stream of air in a main air compressor, wherein the integrated gas turbine/air separation system is operated at part load such that (a) when the gas turbine air compressor supplies compressed air at a given operating pressure which is greater than a minimum air separation unit feed pressure, the air separation unit is operated at a feed pressure essentially equal to the given operating pressure and the feed air is provided to the air separation unit in part by the main air compressor and in part by an additional portion of compressed air from the gas turbine air compressor; and (b) when the gas turbine air compressor supplies compressed air at a given operating pressure which is essentially equal to or less than the minimum air separation unit feed pressure, the air separation unit is operated at a feed pressure essentially equal to the minimum air separation unit feed pressure and the feed air to the air separation unit is provided by the main air compressor without additional compressed air from the gas turbine air compressor.

2. The method of claim 1 wherein the minimum air separation unit feed pressure is between 80 and 500 psia.

3. The method of claim 1 wherein the main air compressor operates such that (c) when the main air compressor operates at a discharge pressure which is greater than the minimum air separation unit feed pressure, the main air compressor is operated above its minimum design total relative compression ratio and below its maximum design relative suction volume flow; and (d) when the main air compressor operates at a discharge pressure which is essentially equal to the minimum air separation unit feed pressure, the main air compressor is operated essentially at its minimum design total relative compression ratio and at or below its maximum design relative suction volume flow; wherein the minimum design total relative compression ratio and the maximum design relative suction volume flow of the main air compressor occur essentially at the minimum air separation unit feed pressure.

4. The method of claim 3 wherein the main air compressor operates at a discharge pressure between 80 and 600 psia.

5. The method of claim 1 which further comprises compressing the oxygen-rich product in an oxygen compressor which operates such that (e) when the main air compressor operates at a discharge pressure which is greater than the minimum air separation unit feed pressure, the oxygen compressor is operated below its maximum design total relative compression ratio and below its maximum design relative suction volume flow; and (f) when the main air compressor operates at a discharge pressure which is essentially equal to the minimum air separation unit feed pressure, the oxygen compressor is operated essentially at its maximum design total relative compression ratio and at or below its maximum design relative suction volume flow;

wherein the maximum design total relative compression ratio and the maximum design relative suction volume flow of the oxygen compressor occur when the main air compressor operates at a discharge pressure which is essentially equal to the minimum air separation unit feed pressure.

6. The method of claim 5 wherein the oxygen compressor operates at a discharge pressure between 120 and 2000 psia.

7. The method of claim 5 which further comprises generating the fuel for the gas turbine combustor by gasifying a carbonaceous feedstock with compressed oxygen-rich product from the air separation unit.

8. The method of claim 7 which further comprises compressing at least a portion of the nitrogen-rich product in a nitrogen compressor for use in the process for gasifying the carbonaceous feedstock.

9. The method of claim 8 wherein the nitrogen compressor operates such that (g) when the main air compressor operates at a discharge pressure which is greater than the minimum air separation unit feed pressure, the nitrogen compressor is operated below its maximum design total relative compression ratio and below its maximum design relative suction volume flow; and (h) when the main air compressor operates at a discharge pressure which is essentially equal to the minimum air separation unit feed pressure, the nitrogen compressor is operated essentially at its maximum design total relative compression ratio and at or below its maximum design relative suction volume flow;

wherein the maximum design total relative compression ratio and the maximum design relative suction volume flow the nitrogen compressor occur when the main air compressor operates at a discharge pressure which is essentially equal to the minimum air separation unit feed pressure.

10. The method of claim 9 wherein the nitrogen compressor operates at a discharge pressure between 50 and 2000 psia.

11. The method of claim 1 which further comprises compressing at least a portion of the nitrogen-rich product in a nitrogen compressor and introducing the resulting compressed nitrogen into the gas turbine combustor.

12. The method of claim 11 wherein the nitrogen compressor operates such that (i) when the main air compressor operates at a discharge pressure which is greater than the minimum air separation unit feed pressure, the nitrogen compressor is operated below its maximum design total relative compression ratio and below its maximum design relative suction volume flow; and (j) when the main air compressor operates at a discharge pressure which is essentially equal to the minimum air separation unit feed pressure, the nitrogen compressor is operated essentially at its maximum design total relative compression ratio and at or below its maximum design relative suction volume flow;

wherein the maximum design total relative compression ratio and the maximum design relative suction volume flow the nitrogen compressor occur when the main air compressor operates at a discharge pressure which is essentially equal to the minimum air separation unit feed pressure.

13. The method of claim 12 wherein the nitrogen compressor operates at a discharge pressure between 120 and 2000 psia.

14. The method of claim 1 wherein the gas turbine expander which drives the compressor also drives an electric generator.

* * * * *